United States Patent
Kooi, Jr. et al.

(10) Patent No.: US 9,278,745 B2
(45) Date of Patent: Mar. 8, 2016

(54) VERTICAL TRAVEL ASSISTANCE UNIT FOR A TROLLING MOTOR

(71) Applicants: William Edward Kooi, Jr., Earleton, FL (US); Arthur Donald Walton, Ponte Verda Beach, FL (US)

(72) Inventors: William Edward Kooi, Jr., Earleton, FL (US); Arthur Donald Walton, Ponte Verda Beach, FL (US)

(*) Notice: Subject to any disclaimer, the term of this patent is extended or adjusted under 35 U.S.C. 154(b) by 0 days.

(21) Appl. No.: 14/327,738

(22) Filed: Jul. 10, 2014

(65) Prior Publication Data
US 2016/0009349 A1    Jan. 14, 2016

(51) Int. Cl.
*B63H 20/10*    (2006.01)
*B63H 20/00*    (2006.01)
*B63H 20/06*    (2006.01)
*F16M 13/02*    (2006.01)

(52) U.S. Cl.
CPC ............ *B63H 20/106* (2013.01); *B63H 20/007* (2013.01); *B63H 20/06* (2013.01); *F16M 13/02* (2013.01)

(58) Field of Classification Search
CPC ...... B63H 20/007; B63H 20/10; B63H 20/08; B63H 23/24; B63H 23/00; B63H 25/42; B63H 5/08; B63H 20/106; B63H 21/17

USPC ......................................................... 440/6, 53
See application file for complete search history.

(56) References Cited

U.S. PATENT DOCUMENTS

| 4,066,032 A | * | 1/1978 | Travis | 440/6 |
| 4,995,839 A | * | 2/1991 | Havins | 440/6 |
| 5,277,630 A | * | 1/1994 | Clark | 440/6 |
| 6,254,441 B1 | * | 7/2001 | Knight et al. | 440/6 |

* cited by examiner

*Primary Examiner* — Lars A Olson
(74) *Attorney, Agent, or Firm* — Evelyn M. Sommer

(57) ABSTRACT

A vertical travel assistance unit for a trolling motor in which the vertical travel assistance unit is attached to the shaft of the trolling motor by at least one mounting bracket or clamp and is attached to the trolling motor boat mount by at least one mounting bracket or clamp. A power cable connects the trolling motor and the vertical travel assistance unit to provide power to the actuator of the vertical travel assistance unit, which permits the vertical travel assistance unit to raise or lower the trolling motor along a vertical axis and wherein the vertical travel assistance unit, having an actuator comprising an actuator shaft; motor shaft and the trolling motor shaft moves up and down when the actuator shaft moves up and down.

14 Claims, 8 Drawing Sheets

VERTICAL TRAVEL ASSISTANCE UNIT FOR A TROLLING MOTOR

CROSS-REFERENCE TO RELATED APPLICATION

This application is related to U.S. Provisional Application Ser. No. 61/810,434 filed on Apr. 10, 2013; such application being incorporated herein by reference thereto.

FIELD OF THE INVENTION

This disclosure is related to the general field of vertical travel assistance units for a trolling motor propulsion system, and more particularly to a mechanical companion unit to move a trolling motor propulsion system vertically in deep or shallow water so as to raise the motor from the water and lower the motor into the water and/or as an assistant for handicapped fisherman while operating a boat.

BACKGROUND OF THE INVENTION

The present invention relates to a support assembly for an outboard trolling motor, and in particular relates to such an assembly that provides a convenient and reliable means to raise the motor from the water and lower the motor into the water while operating a boat.

Outboard trolling motors are widely employed for the purpose of maneuvering a small boat over short distances. Such motors are very popular with fisherman because they allow a fisherman to approach desired fishing areas very closely at low speed, with very little disturbance of the surrounding water. The motors allow fisherman to remain relatively motionless over a desired fishing location, despite wind or other factors that would tend to push the boat away. Such motors also allow the fisherman to slowly and quietly move about in a small area while fishing the entire area as the boat is slowly moved. The motors typically produce almost no noise or vibration because they are powered electrically, generally driven from a battery maintained on the boat. The battery may be dedicated to the trolling motor or, more commonly, serve the dual purpose of driving the trolling motor and providing a source for an electrical start function for the main drive motor. Trolling motors are ideal for use in areas where projections or obstacles may be encountered, which require finely-tuned maneuvering of the boat to avoid damage. Many game fish prefer such areas, and thus trolling motors are employed on the great majority of high-end fishing boats, particularly those boats employed by professional fishermen.

A trolling motor, often used in game fishing, is a marine propulsion system consisting of a self-contained unit that includes an electric motor, a propeller, a shaft connecting the electric motor and the propeller, and controls to operate the trolling motor, A trolling motor can be affixed to a fishing boat, either at the bow or stern, to provide for a secondary means of propulsion. Ordinarily, a trolling motor is manually adjusted on a vertical axis by the user so as to achieve optimal operating height for the relative depth of the water in which a fishing boat is located.

However, in heavy waves, the trolling motor can often be too high to keep the propeller in the water as the wave action raises and lowers the boat's profile in the water. To lower the trolling motor, a user must get on his knees, loosen the trolling motor shaft's height adjustment screw, push the trolling motor propulsion system down, and then re-tighten the height adjustment screw. In heavy wave action, this adjustment can create unsafe conditions caused by the wave action and the change in the boat's profile in the water.

In addition, when the boat travels into shallow water or enters areas with underwater obstacles such as stumps and grass, the trolling motor must be raised to an optimal operating height. In order to lift the trolling motor, the user must get on his knees, loosen the shaft's height adjustment screw, pull the trolling motor up, and then re-tighten the height adjustment screw. Manually adjusting the trolling motor on its vertical axis is a significant physical task, often required to be repeated several times during a day of game fishing.

In addition, for users with physical handicaps such as weak backs or limited strength, the frequent adjustment of the trolling motor along its vertical axis presents a prohibitive challenge.

Watercraft, especially fishing vessels, often employ trolling motors to maneuver or to hold the watercraft in position while the vessel operator fishes. Trolling motors may be interconnected with the watercraft via a mounting bracket secured to the gunnels or transom of the vessel. Conventional mounting brackets are generally adapted with a pivot pin which allows the portion of the bracket adapted to receive the trolling motor to swivel between the stowed position, where the trolling motor is on-board the vessel, and the deployed operation position, where the trolling motor extends into the water.

Although many conventional mounting brackets effectively stow and deploy trolling motors, many require the operator to actuate a lever or other such actuating mechanism to disengage a locking pin (which secures the portion of the bracket adapted to receive the trolling motor in a tilt position relative to the remainder of the bracket assembly) before swiveling the trolling motor to a different tilt position such as the stowed position. Similarly, many conventional mounting brackets require the operator to continue actuating the mechanism to disengage the locking pin for the entire duration of the swiveling of the trolling motor. Requiring the operator to actuate the mechanism to disengage the locking pin before tilting (and during the tilting of) the trolling motor may be inconvenient or undesirable in many situations, including situations where quick upward tilting or stowage of the trolling motor would be expedient. One such situation would occur, for example, when the watercraft enters shallow water where the motor shaft or drive unit of the trolling motor may contact underwater obstructions. In such a situation, it would be convenient and expedient for the operator to quickly tilt and/or stow the trolling motor.

SUMMARY OF THE INVENTION

The present invention is directed to a vertical travel assistance unit for a trolling motor. The vertical travel assistance unit allows the user to raise or lower the trolling motor along the trolling motor's vertical axis more conveniently without bending and with minimal physical effort.

Trolling motors are usually attached at either the bow or the stern of the boat, as desired by the operator, but are more often mounted at the bow. One purpose for this mounting position is to avoid interference with an outboard or inboard/outboard main drive unit, which is typically mounted at the stern of a fishing boat.

To avoid drag and potential damage to the trolling motor, a trolling motor must be removed from the water when the boat is operated at speed under the propulsion of its main drive unit. Once the boat approaches the general area of the operator's destination, such as a fishing spot identified by the operator, the main drive unit is shut off and the trolling motor must be lowered into the water. This operation should ideally be performed as silently as possible, with a minimum of water disturbance in order to avoid frightening fish in the immediate area of the boat. The operation should also be performed as quickly as possible, particularly when the operator is a professional fisherman competing in a timed fishing event or tournament. In a typical trolling motor mounting arrangement, removing the trolling motor from the water requires that the trolling motor head be pulled back over the boat, and the propulsion unit rotationally lifted from the water and pulled back onto the boat by movement of the shaft up and over the side of the boat. The reverse operation is required for placement of the trolling motor into the water when a desired location is reached.

While in some trolling motor units this raising and lowering operation must be performed manually, other trolling motors include a geared system providing a motor-operated function to raise and lower the trolling motor. An example of this latter type of arrangement is taught in U.S. Pat. No. 3,980,039 to Henning. Such prior art systems as taught by Henning result in a cumbersome mechanism for raising and lowering a trolling motor. A large amount of space in the boat must be dedicated to placement of the trolling motor in a horizontal position once the trolling motor is raised from the water.

In addition, the prior art systems provide no effective protection for the trolling motor should an underwater obstacle be struck during operation of the boat. Striking an obstacle during operation is a common occurrence, since trolling motors are often operated in areas where underwater obstructions are frequently encountered, such as near the bank of a body of water or near a submerged tree. Although the boat is typically moving at low speed when this occurs, trolling motor propulsion units are small and fragile, and even a low-speed collision with an underwater obstacle may render a trolling motor inoperable.

What is desired then is an improved vertical travel assistance unit for a trolling motor that overcomes each of these disadvantages.

In one embodiment of the invention, a vertical travel assistance unit for a trolling motor is disclosed, comprising: (1) a substantial integral part, comprising an actuator capable of converting electrical signals into motion controls, and a vertically-disposed shaft, capable of receiving the motion controls from the actuator and moving linearly; (2) a first bracket, attaching to a first end of the substantial integral part and securing said integral part to a first portion of a shaft of the trolling motor; (3) a second bracket, attaching to a second end of the substantial integral part of the vertical travel assistance unit and securing said integral part to the trolling motor boat mount; and (4) a power supply, connecting the trolling motor gear housing and the vertical travel assistance unit actuator, which provides electrical power to the actuator.

In another embodiment of the present invention, a trolling motor assembly having a travel assistance unit is described. The trolling motor assembly, which automatically adjusts the relative height of the trolling motor's propeller in the water, comprises:

(1) a trolling motor, having a trolling motor shaft; and
(2) a linear travel assistance unit, having an actuator comprising an actuator shaft;

wherein the linear travel assistance unit is connected to the trolling motor shaft and the trolling motor shaft moves up and down when the actuator shaft moves up and down.

BRIEF DESCRIPTION OF THE DRAWINGS

The invention and the detailed description thereof may be understood by reference to the following figures:

FIG. 2a and FIG. 2b are engineering design drawings of an exemplary top actuator mount 104 in an exemplary vertical travel assistance unit, wherein FIG. 2a is a front view of element 104 in FIG. 1 and FIG. 2b is a bottom view of element 104 in FIG. 1;

FIG. 3a and FIG. 3b are engineering design drawings of an exemplary top bracket 126 in an exemplary vertical travel assistance unit, wherein FIG. 3a is a side view of element 126 in FIG. 1 and FIG. 3b is a front view of element 126 in FIG. 1;

FIGS. 4a-4c are engineering design drawings of an exemplary bottom actuator bracket 122 in an exemplary vertical travel assistance unit, wherein FIG. 4a is a front view of element 122 in FIG. 1, FIG. 4b is a right side view of element 122 in FIG. 1, FIG. 4c is a bottom view of element 122 in FIG. 1;

FIGS. 5a-5b are engineering design drawings of an exemplary bottom attachment 124 in an exemplary vertical travel assistance unit, wherein FIG. 5a is a front view of element 124 of FIG. 1 and FIG. 5b is a bottom view of element 124 in FIG. 1;

FIGS. 6a-6b are engineering design drawings of an exemplary bottom bracket 122 in an exemplary vertical travel assistance unit, wherein FIG. 6a is a right side view of element 122 of FIG. 1 and FIG. 6b is a top view of element 122 in FIG. 1;

FIGS. 7a-7b are engineering design drawings of an exemplary bottom attachment bolt 120 in an exemplary vertical travel assistance unit, wherein FIG. 7a is a front view of element 120 of FIG. 1 and FIG. 7b is a top view of element 120 in FIG. 1; FIG. 8a is a front view of element 112 of FIG. 1 and FIG. 8b is a bottom view of element 112 in FIG. 1.

DETAILED DESCRIPTION OF SELECTED EXAMPLES

Hereinafter, selected examples and operating modes of preferred embodiments of a vertical travel assistance unit for a trolling motor in accordance with the invention will be described with reference to the accompanying drawings. It will be appreciated by those skilled in the art that the following description is for illustrative purposes only, and should not be interpreted as a limitation of the invention. Other variations within the spirit and scope of this disclosure are also applicable.

"Optional" or "optionally" means that the subsequently described circumstance may or may not occur, so that the description includes instances where the circumstance occurs and instances where it does not.

The present invention discloses an electrically-operated vertical travel assistance unit mounted to a trolling motor.

Specifically, the invention is directed to a vertical travel assistance unit comprising an electrically operated actuator which is mounted at one end thereof to the shaft of the trolling motor by a mounting bracket or clamp and at the other end thereof to the trolling motor boat mount. The vertical travel assistance unit can vertically raise and lower the trolling motor using an electric or hydraulic actuator. In one embodiment of the present invention, the actuator is powered by a 12-volt battery.

Figure 1:
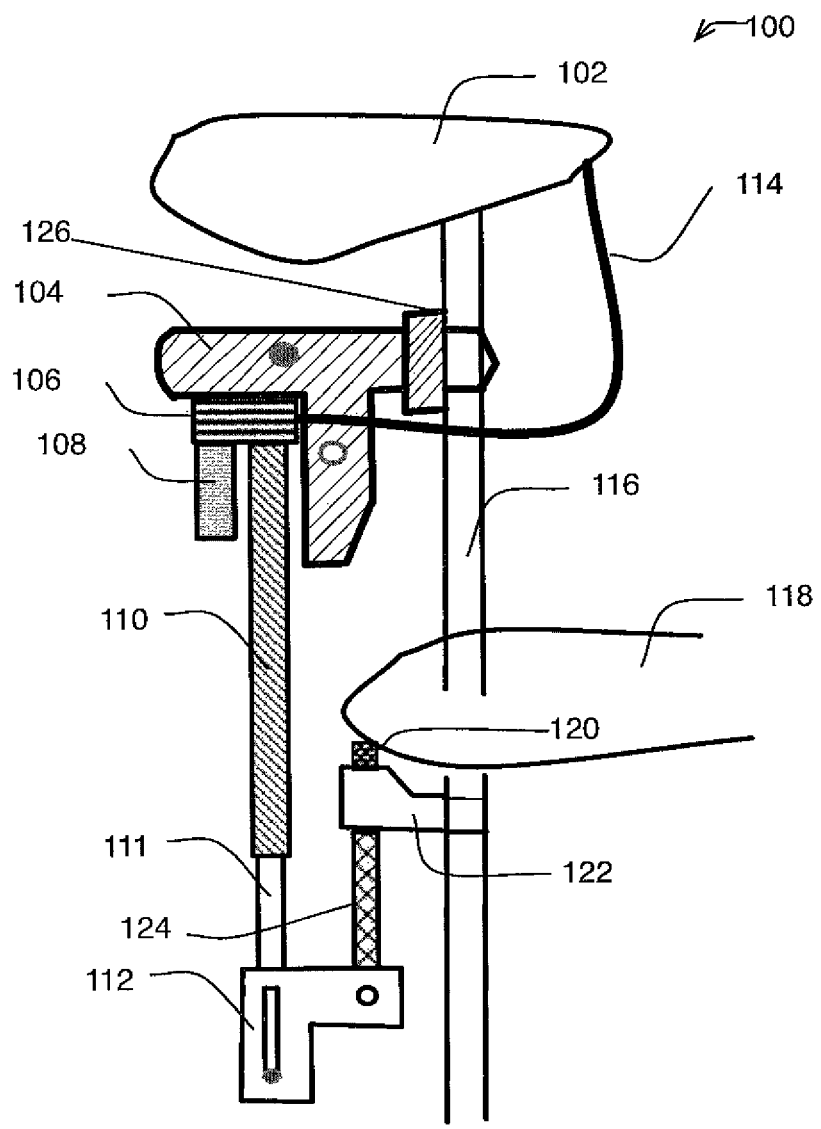
FIG. 1 illustrates an exemplary vertical travel assistance unit in accordance with the aspects of the present invention.

FIG. 1 illustrates a trolling motor assembly 100 comprising a trolling motor and a vertical travel assistance unit. The trolling motor in said trolling motor assembly is comprised of a trolling motor gear housing 102, a trolling motor shaft 116, a trolling motor boat mount 118 and a propeller system (not shown). The trolling motor is attached to the boat through trolling motor boat mount 118. In one embodiment of the present invention, the trolling motor assembly 100 is used on a bass boat for game fishing.

The vertical travel assistance unit of the trolling motor assembly 100 is comprised of a substantial integral part, said substantial integral part being attached to the trolling motor shaft 116 with top bracket 126 and attached to the trolling motor boat mount 118 with bottom bracket 122. The substantial integral part is comprised of: (1) an actuator 106; (2) a top actuator mount 104; (3) a bottom actuator mount 112; (4) two actuator motors 108 and 110; and an actuator shaft 111. When actuator motors 108 and 110 rotate, the actuator shaft 111 moves along a vertical axis with respect to trolling motor boat mount 118.

The substantial integral part is connected to the two brackets (122 and 126) through two actuator mounts (104 and 112). The top of actuator 106 is directly connected to the top actuator mount 104. The bottom of the actuator is attached to the bottom bracket 122 through one or more fitting elements. In the examples of the present invention, said fitting elements include, but are not limited to, a bottom actuator mount 112, a bottom attachment 124 and bottom attachment bolt 120.

Further, the vertical travel assistance unit in the trolling motor assembly 100 comprises a power cable 114, which power cable extends out of the trolling motor gear housing 102 to the actuator 106, providing electrical energy to the actuator. Upon turning on the actuator, the shaft 116 of the trolling motor moves along with the actuator shaft 111.

Figure 2A:
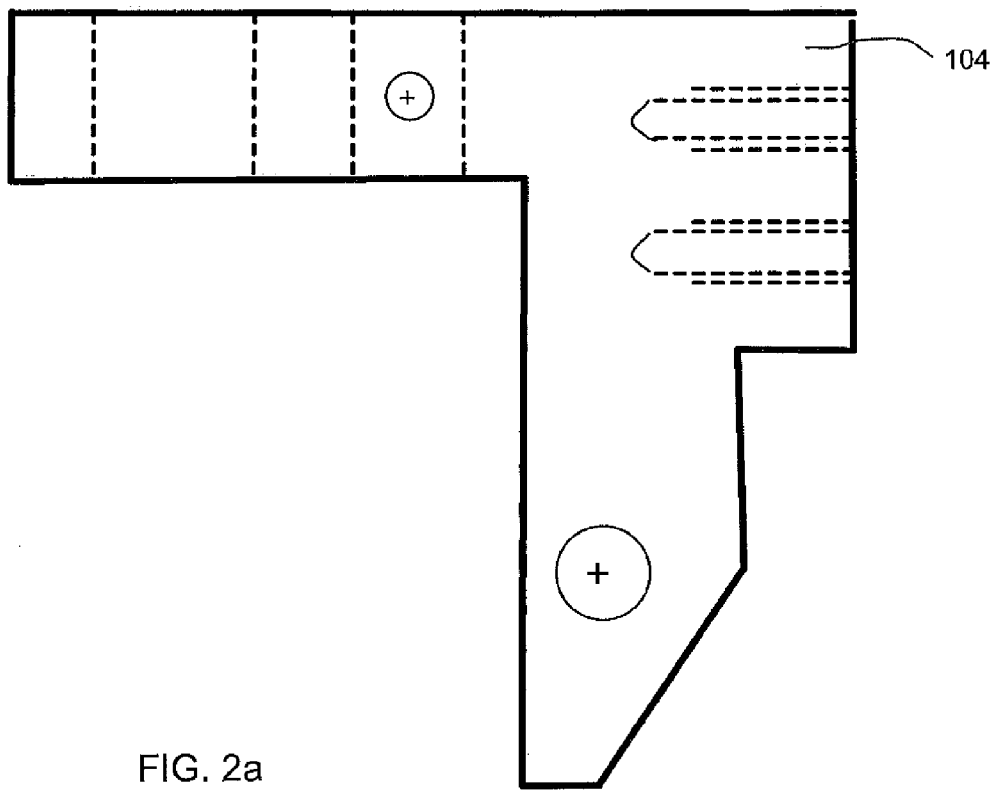
Figure 2B:
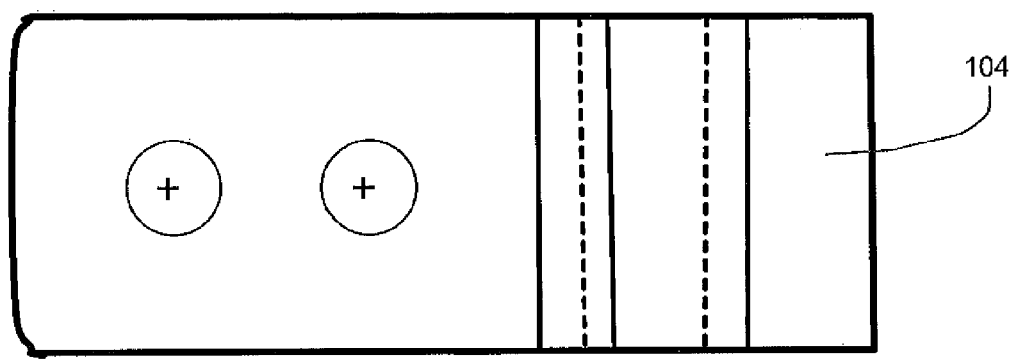

FIGS. 2a-2b illustrate an example of the top actuator mount 104. The two drawings are different views of the same exemplar top actuator mount 104. In a preferred embodiment of the invention, the exemplar top actuator may comprise a plate having two holes. Optionally, the top actuator mount 104 is substantially T or L shaped. In embodiments of the invention, the top actuator 104 uses 6429 aluminum.

Figure 3A:
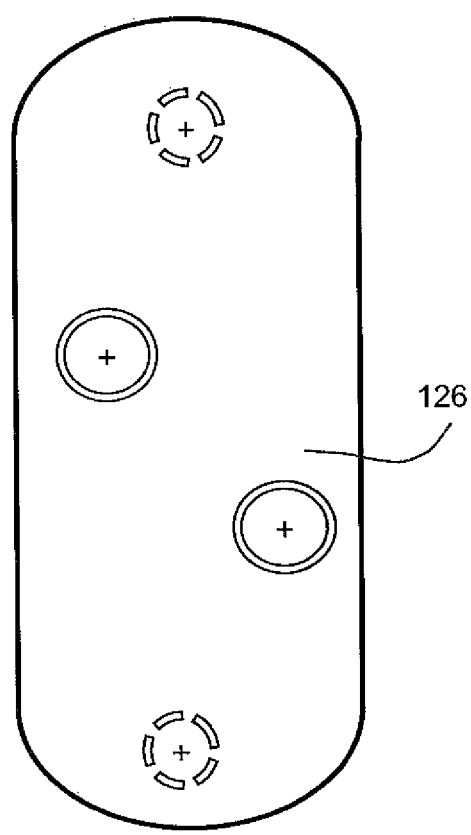
Figure 3B:
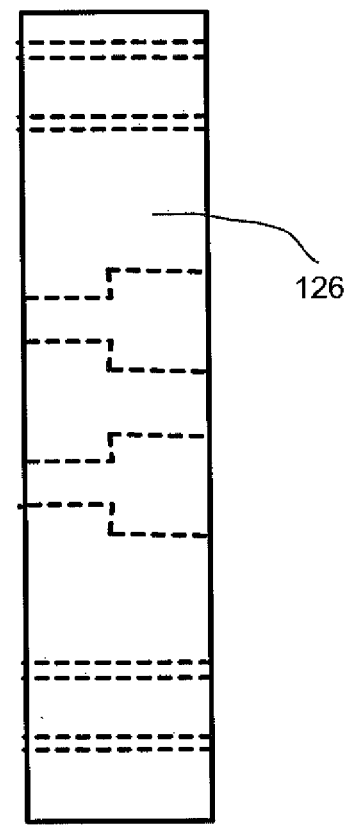

FIGS. 3a-3b illustrate an example of the top bracket 126. The two engineering drawings are different views of the same top bracket 126. In one preferred embodiment of the invention, the plate of the top bracket 126 has four holes, utilizing two pairs of different securing bolts. In one embodiment of the invention, the top actuator 126 uses 6429 aluminum.

Figure 4A:
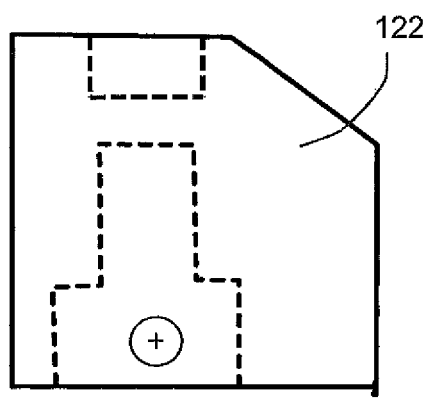
Figure 4B:
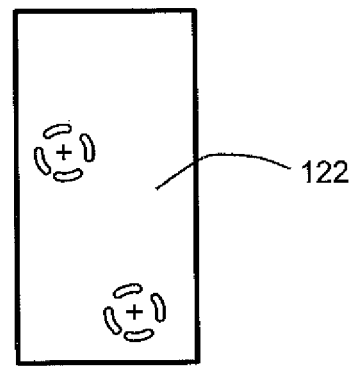
Figure 4C:
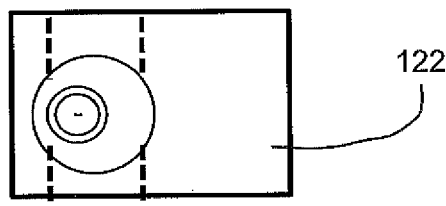

FIGS. 4a-4c are engineering drawings of an exemplary bottom bracket 122. The three engineering drawings are different views of the same bottom bracket 122. In one embodiment of the invention, the bottom actuator 122 is made of 6429 aluminum.

Figures 5A, 5B:
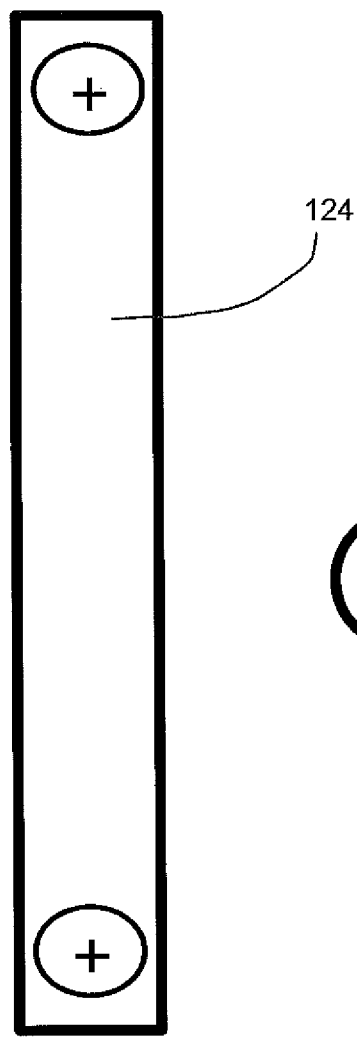

FIGS. 5a-5b are engineering drawings of an exemplary bottom attachment 124. The two engineering drawings are different views of the same bottom attachment 124. In one embodiment of the invention, the bottom actuator 124 is made of 6429 aluminum.

Figure 6A:
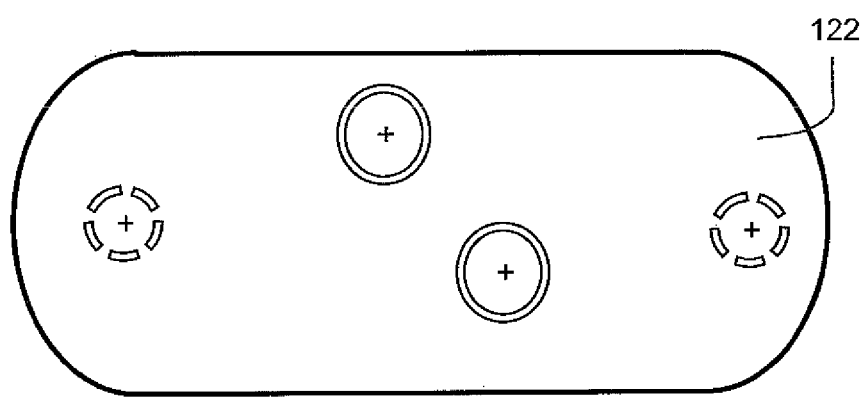
Figure 6B:
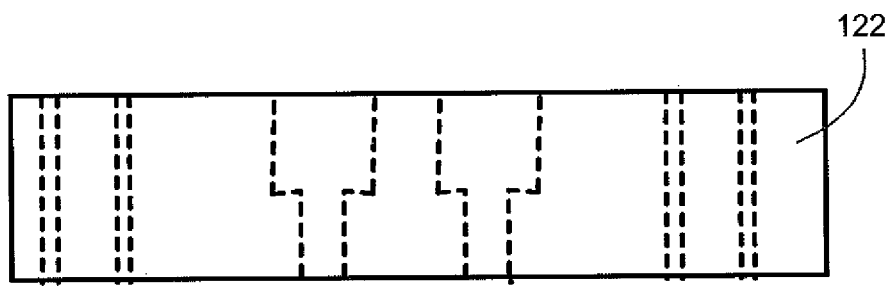

FIGS. 6a-6b are engineering drawings of an exemplary bottom attachment bolt 120. The two drawings are different views of the same bottom attachment bolt 120. In one embodiment of the invention, the bottom actuator 120 is made of 6429 aluminum.

Figure 7A:
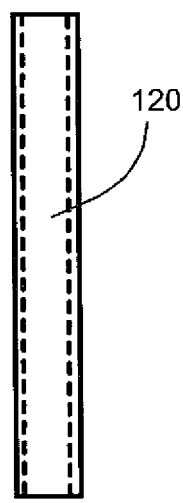
Figure 7B:
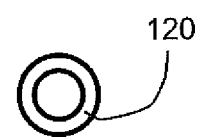
Figure 8A:
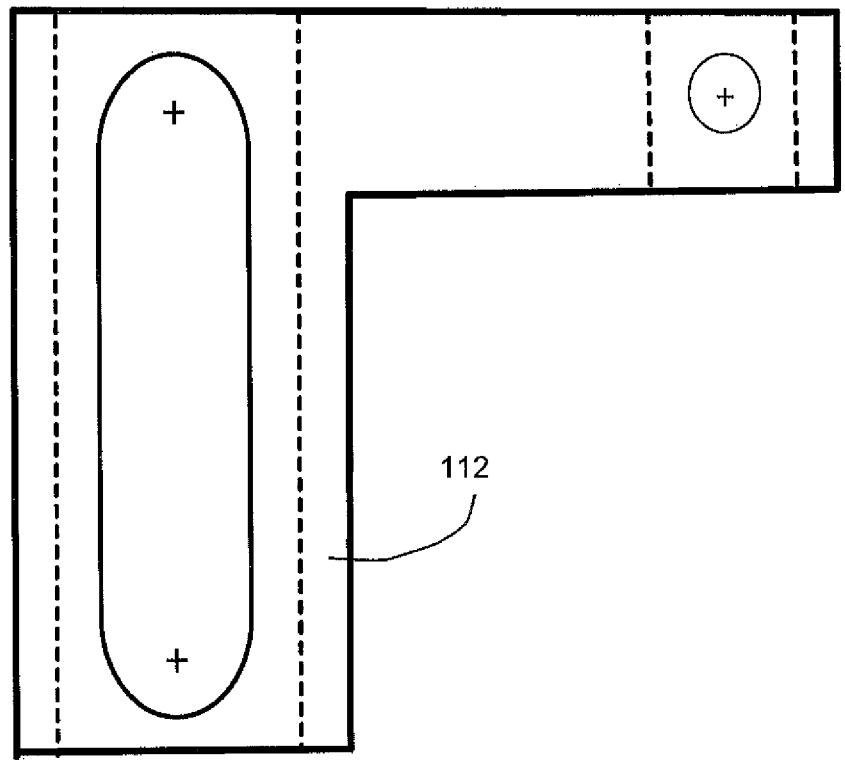
FIGS. 8a-8b are engineering design drawings of an exemplary bottom actuator mount 112 in an exemplary vertical travel assistance unit.
Figure 8B:
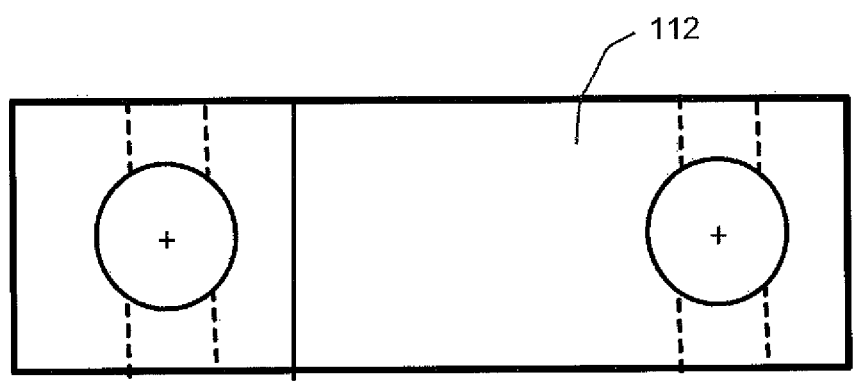

FIGS. 7a-7b are engineering drawings of an exemplary bottom actuator mount 112. The two drawings are different views of the same bottom actuator mount 112. In one preferred embodiment of the invention, the bottom actuator mount is substantially L shaped. In one embodiment of the invention, the bottom actuator 112 is made of 6429 aluminum.

As shown in FIG. 1, the bottom attachment 124 is attached at one end thereof to bottom bracket 122 by way of bottom attachment bolt 120, and is attached at the other end thereof to bottom actuator mount 112. Actuator shaft 111 is connected to actuator 106 at the upper end thereof by way of actuator motor 110, and is attached at the lower end thereof to bottom actuator attachment 112. Actuator shaft 111 and trolling motor shaft 116 are substantially parallel, such that when actuator shaft 111 moves, trolling motor shaft 116 moves in a corresponding fashion. Trolling motor shaft 116 can move a maximum of approximately 12.5 inches. The trolling motor can be raised or lowered between a range of about 0 to about 12.5 inches.

In one preferred embodiment of the invention, trolling motor assembly 100 further comprises an electronic unit, which allows a user to send an electrical signal to the vertical travel assistance unit and adjust the height of the trolling motor by pushing an "up" or "down" button on the electronic unit.

In another preferred embodiment of the invention, the electronic unit comprises a measuring system capable of detecting the relative height of trolling motor propeller in the water. In another embodiment of the invention, the electronic unit comprises a software application system capable of calculating the height of the trolling motor based on location and time information.

The frame portion and the hinged portion can be formed of a material suitable for use in a marine environment and capable of supporting substantially the same weight as the portion of the deck that is being replaced. In preferred embodiments of the invention, at least one of the top or bottom actuators is made of King StarBoard®, manufactured by King Plastic Corporation, 1100 N. Toledo Blade Blvd., North Port, Fla. 34288. King StarBoard® is the original marine-grade polymer and is considered to be the industry standard. It is the product of a proprietary process called K-Stran,® the manufacturing process available for producing consistently flat continuous sheets. King StarBoard® is environmentally stabilized to withstand the harshest marine conditions. it will not rot, or discolor like teak and other solid woods, and it will not delaminate like wood laminates. King StarBoard® is easy to work with using standard woodworking tools, and design changes are a snap. In addition, the installed cost of King StarBoard® is less than teak, and other common marine woods, and fiberglasss. Plus, the large sheet sizes maximizes the yield.

In addition to StarBoard®, the frame portion and the hinged portion may be formed from high-density polyethylene; Delrin®, a highly-crystalline, acetal homopolymer resin that is rigid, hard and resistant to corrosion and is available from Du Pont; acetyl plastic; and ultra-high-molecular-weight polyethylene.

The apparatus for mounting a trolling motor to a watercraft in accordance with the invention includes a bracket and a coupling hinge. The bracket is adapted to mount on a transom or a gunnel of the watercraft. The coupling hinge receives and rotatably retains the trolling motor. The coupling hinge and bracket have corresponding male and female surface profiles which form a track that allows the coupling hinge to slide with respect to the bracket along the track to move the trolling motor between a stowed position and a deployed position.

In accordance with a preferred embodiment, a bracket is provided to secure the device to the trolling motor base of the troll motor arm, which can be screwed in place to be the anchor location of the device. It would be used in place of reference numerals 120 and 122 of FIG. 1. It preferably will be made of welded metal material.

The present invention has been described with reference to certain preferred and alternative embodiments that are intended to be exemplary only and not limiting to the full scope of the present invention as set forth in the appended claims.

In the figures, the following reference numerals are utilized to identify the respective elements of the invention:

A trolling motor assembly having a vertical travel assistance unit 100;
Trolling motor gear housing 102;
Top actuator mount 104;
Actuator 106;
Actuator motor 108;
Actuator motor 110;
Actuator shaft 111;
Bottom actuator mount 112;
Power cable 114;
Trolling motor shaft 116;
Trolling motor boat mount 118;
Bottom attachment bolt 120;
Bottom bracket 122;
Bottom attachment 124; and
Top bracket 126.

We claim:

1. A vertical travel assistance unit for a trolling motor, comprising:
   a) a support assembly comprising:
      (i) an actuator capable of converting electrical signals into motion controls,
      (ii) a vertically disposed actuator shaft capable of receiving the motion controls from the actuator and moving linearly;
   b) a first bracket attached to a first end of the support assembly and securing said support assembly to a first portion of a trolling motor shaft;
   c) a second bracket attached to a second end of the support assembly and securing said support assembly to a first portion of a trolling motor boat mount; and
   d) a trolling motor gear housing a power supply connecting the trolling motor gear housing to the actuator and providing electrical power to the actuator.

2. The vertical travel assistance unit of claim 1, wherein the actuator is a hydraulic cylinder.

3. The vertical travel assistance unit of claim 1, wherein the actuator is an electrical actuator.

4. The vertical travel assistance unit of claim 1, wherein the actuator shaft of the trolling motor moves vertically.

5. The vertical travel assistance unit of claim 1, wherein the support assembly further comprises a top actuator mount and the actuator is attached to the first bracket through the top actuator mount.

6. The vertical travel assistance unit of claim 1, wherein the support assembly further comprises one or more additional fitting elements, and the actuator is attached to the second bracket through additional fitting elements.

7. The vertical travel assistance unit of claim 5, wherein the top actuator mount is substantially T-shaped or L-shaped.

8. The vertical travel assistance unit of claim 6, wherein the additional fitting elements include a bottom actuator mount, a bottom attachment and a bottom attachment bolt.

9. The vertical travel assistance unit of claim 8, wherein the bottom actuator mount is connected to the actuator through the actuator shaft.

10. The vertical travel assistance unit of claim 1, wherein the vertical travel assistance unit moves the trolling motor shaft between approximately 0 and approximately 12.5 inches.

11. The vertical travel assistance unit of claim 1, wherein the trolling motor shaft moves in correspondence with the actuator shaft.

12. The vertical travel assistance unit of claim 1, wherein the actuator is powered by a 12-volt battery.

13. A trolling motor assembly adjusting the height of the trolling motor's propeller in water, comprising:
   a) a trolling motor, having a trolling motor shaft;
   b) a vertical travel assistance unit, having an actuator comprising an actuator shaft;
   wherein the vertical travel assistance unit is connected to the trolling motor on the trolling motor shaft and the trolling motor shaft moves up and down when the actuator shaft moves up and down; and
   c) an electronic unit comprising:
      (i) a measuring system, to detect the relative height of trolling motor in the water automatically; and
      (ii) a control system, which takes the signal from the measuring system and sends operation signals to the actuator to adjust the height of the actuator shaft.

14. The assembly of claim 13, further comprising an electronic unit, capable of communicating with application software through a wireless network, tracking the location of the trolling motor by a global positioning system, calculating the height of the trolling motor based on time and location information and sending a signal to the actuator to adjust the height of the actuator shaft automatically.

* * * * *